United States Patent [19]

Weber et al.

[11] Patent Number: 5,231,553
[45] Date of Patent: Jul. 27, 1993

[54] SYSTEM COMPRISING MAGNETIC TAPE CASSETTE APPARATUS AND TWO DIFFERENT TYPES OF MAGNETIC TAPE CASSETTES PLAYABLE IN SUCH APPARATUS

[75] Inventors: Georg Weber, Lohra; Thomas Scholz, Winkels, both of Fed. Rep. of Germany; Norbert C. Vollmann, Veldhoven, Netherlands

[73] Assignee: U.S. Philips Corporation, New York, N.Y.

[21] Appl. No.: 925,241

[22] Filed: Aug. 4, 1992

Related U.S. Application Data

[63] Continuation of Ser. No. 629,512, Dec. 18, 1990, abandoned.

[30] Foreign Application Priority Data

Dec. 18, 1989 [NL] Netherlands .......................... 8903088
Feb. 14, 1990 [NL] Netherlands .......................... 9000348
Oct. 18, 1990 [DE] Fed. Rep. of Germany ....... 4033095

[51] Int. Cl.$^5$ .............................................. G11B 5/008
[52] U.S. Cl. ...................................... 360/96.5; 360/94
[58] Field of Search ............................ 360/96.5, 94

[56] References Cited

U.S. PATENT DOCUMENTS 4,984,108 1/1991 Grant ................................. 360/94 X
5,046,169 9/1991 Tsujino ............................. 360/96.5

*Primary Examiner*—A. J. Heinz
*Attorney, Agent, or Firm*—Brian J. Wieghaus

[57] ABSTRACT

A system consists of a magnetic-tape-cassette apparatus, comprising a deck and a loading mechanism (27) for magnetic-tape cassettes, and of a magnetic-tape cassette (3, 13) provided with recesses (6) which are each engageable with one coupling member (32) of the loading mechanism (27) to perform further loading and unloading functions, in which for handling magnetic-tape-cassette types (3, 13) with different recording standards and housing constructions a special coupling member (32, 33) of the loading mechanism has been assigned to each type of magnetic-tape cassette with its specially constructed recess (6, 21).

22 Claims, 8 Drawing Sheets

SYSTEM COMPRISING MAGNETIC TAPE CASSETTE APPARATUS AND TWO DIFFERENT TYPES OF MAGNETIC TAPE CASSETTES PLAYABLE IN SUCH APPARATUS

This is a continuation of application Ser. No. 07/629,512, filed Dec. 18, 1990, abandoned.

BACKGROUND OF THE INVENTION

The invention relates to a system consisting of a magnetic-tape-cassette apparatus, comprising a deck and a loading mechanism for magnetic-tape cassettes, and of a magnetic-tape cassette provided with recesses which are each engageable with one coupling member of the loading mechanism to perform further loading and unloading functions.

Such a system comprising a magnetic-tape-cassette apparatus and a magnetic-tape cassette which cooperate functionally with each other is known from German Patent P 37 19 890.04, which corresponds to U.S. Pat. No. 4,924,336. The loading mechanism of this system is described in German Patent P 39 04 483.1, which corresponds to U.S. application Ser. No. 480,427 filed Feb. 15, 1990 of Karl Klos-Hein et al. In said mechanism a cassette holder can be lowered vertically from an ejection plane into a playing plane. The cassette holder has been constructed to play analog magnetic-tape cassettes comprising two tape reels which are engaged by winding spindles of the deck when the cassette is inside the apparatus. The magnetic tape is moved longitudinally past a stationary magnetic head, which is pressed against the tape. There is provided a coupling member which is engageable in the first reel-spindle hole, viewed in the direction of insertion, when a cassette is inserted by hand. After a pull-in motor has been started this coupling member pulls the magnetic-tape cassette further inward into the play position.

Recently digitally recorded magnetic-tape cassettes have become available, in which the magnetic tape is scanned by a rotating magnetic head. The dimensions of these digitally recorded cassettes differ so much from the analog recorded cassettes that a completely different deck is needed for these digital cassettes.

SUMMARY OF THE INVENTION

It is an object of the invention to provide a system of the type defined in the opening paragraph, which is capable of playing conventional recorded magnetic-tape cassettes of the analog type, with a new magnetic-tape cassette, by means of which system it becomes possible to play magnetic-tape cassette types with different tape-recording standards.

According to the invention this object is achieved in that for handling magnetic-tape-cassette types with different recording standards and housing constructions a special coupling member of the loading mechanism has been assigned to each type of magnetic-tape cassette with its specially constructed recess.

Thus, the magnetic-tape cassettes of different types will be treated as required for each specific type.

In a further embodiment of the invention, in which the magnetic-tape cassettes of the system are magnetic-tape cassettes of a first type having two parallel main walls formed with two recesses forming reel-spindle holes in which a first coupling member of the loading mechanism is engageable, the magnetic-tape cassettes of a different recording standard are magnetic-tape cassettes of a second type having two parallel main walls, one of said main walls being substantially imperforate and being formed with a further recess, and the loading mechanism comprises a second coupling member which is engageable in the further recess.

In a further embodiment of the invention a coupling member for one cassette type, controlled by housing portions of the cassette of said one type, can be pressed into the recess in the cassette of said one type by means of a coupling member for a cassette of the other type.

This results in a functional interaction between the coupling members of the loading mechanism and the recesses of the cassette for cassettes of one type, the construction of the one cassette type dictating the engagement of the coupling member for this type.

In a further embodiment of the invention in the case of an apparatus constructed for magnetic-tape cassettes of two types the two coupling members used for said cassettes are arranged at the ends of a tumbling bar which extends in the direction of insertion and whose tumbling-bar spindle is movable by means of an intermediate member which can be actuated by the loading mechanism. The tumbling bar enables the cooperation between recesses in the housings of the magnetic-tape cassettes of different types and the associated coupling members to be discontinued simply because the recesses of the different types of magnetic-tape cassette are situated at different locations. As a result of the upward movement of the tumbling bar at the end of an unloading movement the coupling members are moved away so far from the inserted cassette that this cassette can be moved out regardless of the cassette type.

In a further embodiment of the invention the tumbling-bar spindle, which moves the tumbling bar, is not lowered into the position in which a coupling member is engageable in the associated recess until the tumbling bar has substantially reached this position. Consequently, the coupling members are only dragged along the cassette housing over a short length.

In a further embodiment of the invention the first coupling member, which is situated at the front of the tumbling-bar viewed in the direction of insertion, is adapted to cooperate with a recess in the form of a reel-spindle hole of the cassette of the first type, and the second coupling member, which is situated at the rear of the tumbling-bar viewed in the direction of insertion, is adapted to cooperate with a recess in the form of a groove in the cassette of the second type, which groove has been formed near a narrow side wall of the housing, the cassette being inserted with said narrow side wall facing the loading mechanism. Thus, always one coupling member abuts against a cassette side wall and presses the other coupling member into the recess of this cassette. Thus, the engagement with the relevant recess is controlled automatically by the mere movement of the magnetic tape cassette relative to the tumbling bar. As soon as a coupling member has engaged the associated recess a pull-in motor pulls the magnetic-tape cassette further into the holder of the loading mechanism via the coupling member.

The analog magnetic-tape cassette is open at its front side. The openings allow entry of the magnetic head and pressure rollers of the apparatus. When this cassette is not used it is stored in a storage case. This means that for each cassette there are normally two parts, i.e. the cassette itself and the storage case. In the case of the digital cassette the storage case has been dispensed with because the front of the cassette with its opening is closed by a sliding cover. Before such a digital cassette can be used the sliding cover must be slid from the closed position into an open position in which the cassette openings are exposed to allow the introduction of the sound head, pressure rollers and capstans. Consequently, the sliding cover has to be moved only when the cassette is put into operation. This means that no sliding cover has to be moved when an analog cassette without sliding cover is used. Therefore, the loading mechanism should detect whether a sliding cover is to be opened.

In a further embodiment, in order to achieve this, the tumbling bar comprises a lateral projection which, via a linkage, can pivot an opener pin near a front wall of the cassette into a guide profile of the cassette to move a sliding cover, which in its closed position covers openings in the front wall of the magnetic-tape cassette, the linkage acting upon a lever which carries the opener pin and which is pivotable over one of the main walls of the cassette, thereby causing the opener pin to engage the guide profile. In a modification of this embodiment the lever is fork-shaped and has arms forming the tines, which are pivotable over the main walls of the cassette, one arm carrying the opener pin and engaging the guide profile in one main wall during the pivotal movement and the other arm engaging underneath the other main wall. One arm carries the opener pin and during the pivotal movement guides this pin into the guide profile in one main wall, the other arm engaging underneath the other main wall.

The tumbling bar, which has already detected which cassette type has been inserted into the holder of the loading mechanism, ensures that during the engaging movement of a digital cassette the opener pin is pivoted into a position in which it retains the sliding cover, so that the front wall of the digital cassette is exposed. Conversely, when an analog cassette is inserted, it remains outside the magnetic-tape cassette, so that the analog cassette, which does not have a guide profile for a sliding cover, can move freely past the pin.

In order to enable the arms of the fork-shaped lever to engage over the main surfaces of the cassette, the junction of the fork-shaped lever is vertically pivotable before the cassette front wall. Another advantage of the fork arrangement is that the one arm can guide the opener pin reliably in the guide profile. It is prevented from being disengaged from the guide profile by the other lever arm, which engages over the other main surface of the cassette and does not allow a displacement of the magnetic-tape cassette owing to tolerances. Thus, the opener pin has to remain in the guide profile as long as the cassette is inside.

In a further embodiment of the invention the linkage is constituted by a wire spring by means of which a plate, from which the opener pin and an additional guide pin project, is movable in such a manner that the opener pin is engageable in the guide profile in the upper main wall.

The invention further relates to a magnetic-tape cassette for use in a system in accordance with the invention, comprising a magnetic tape wound on two coplanar reels in a housing having two plane-parallel main walls, one of said walls being formed with two reel-spindle holes for the passage of two reel-drive spindles of an apparatus, which main walls are interconnected by transverse walls, of which one wall constitutes a cassette front wall having a central opening for the passage of a magnetic head and a pressure roller opening for the passage of a pressure roller of an apparatus, which cassette has a sliding cover which is movable between a closed position, in which it covers the openings, and an open position, in which it exposes said openings. The magnetic-tape cassette in accordance with the invention is characterized in that the centre of the groove in the substantially imperforate main wall is situated at the same distance from the cassette front wall as the centres of the reel-spinle holes, and the groove extends perpendicularly to the cassette front wall and is situated in the main wall in the proximity of a narrow side wall. By positioning the groove at the same distance to the cassette front wall as the reel-spindle holes, the coupling member can be made compact and does not have to be displaced to cooperate both with the analog cassette as with the digital cassette.

BRIEF DESCRIPTION OF THE DRAWINGS

The invention will now be described more detail, by way of example, with reference to the drawings. In the drawings FIG. 2b shows the loading mechanism after loading of an analog magnetic-tape cassette, a coupling member having engaged a reel-spindle hole of the magnetic-tape cassette, so that the coupling member can move the magnetic-tape cassette as it is further pulled in.

DESCRIPTION OF THE PREFERRED EMBODIMENTS

Figure 1A:
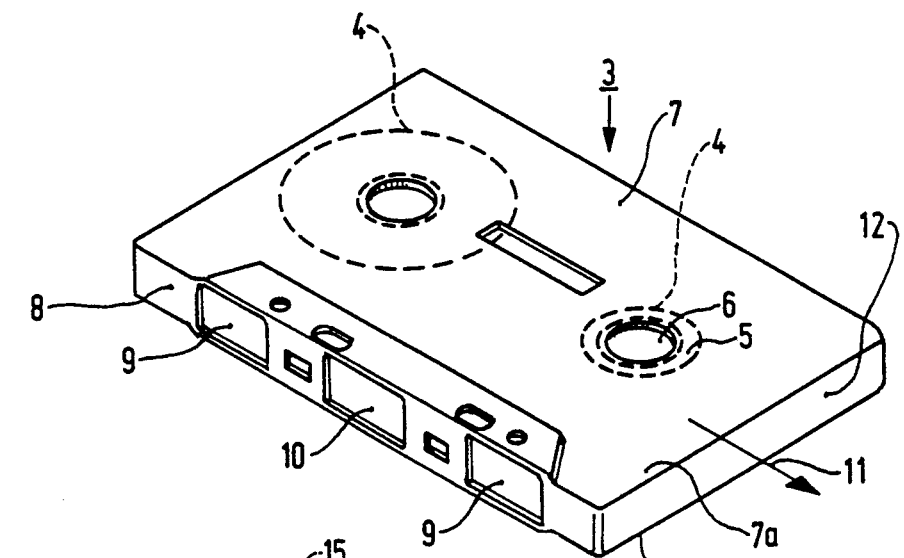
FIG. 1 shows an audio magnetic-tape cassette which has been recorded in an analog fashion and which can be played in an analog fashion.
FIG. 1b shows an audio magnetic-tape cassette which has been recorded digitally and can be played back digitally, and which comprises a sliding cover which in the rest position covers the cassette openings in the front wall.
FIG. 1c shows the front part of the magnetic-tape cassette shown in FIG. 1b with the sliding cover slid aside, the sliding cover then being in its open position.
Figure 1B:
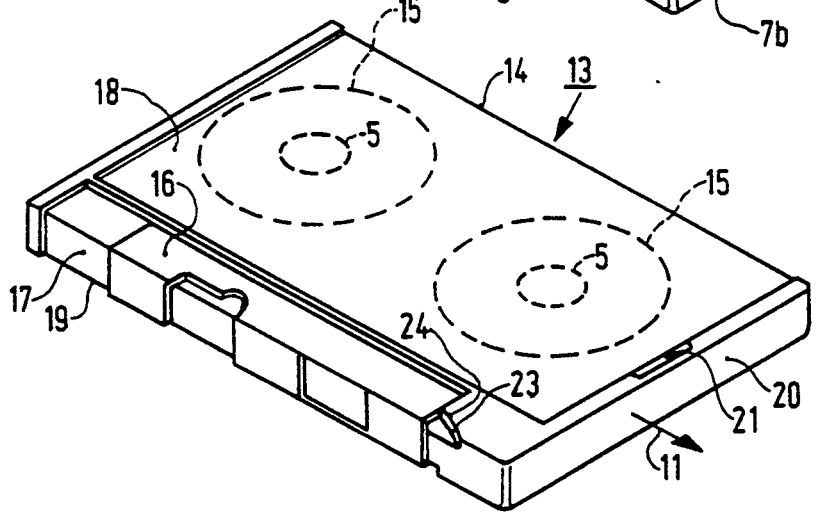
Figure 1C:
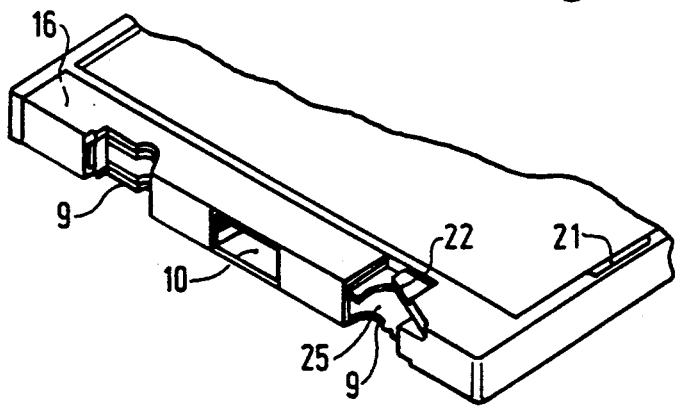

FIG. 1 shows a magnetic-tape cassette 3 containing a magnetic tape on reels 4 represented in broken lines. The magnetic-tape reels 4 have been wound on reel hubs 5 with which the reel spindles, not shown, of a playing apparatus are engageable through reel-spindle holes 6 in the cassette housing 7. In its front wall 8 the housing 7, which has parallel upper (7a) and lower (7b) main walls, has openings 9 through which the pressure rollers of the apparatus can be applied to the magnetic tape in the cassette 3 from the outside. A further opening 10 in the centre of the front wall is provided for the passage of a magnetic head. When the magnetic-tape cassette is used in an apparatus comprising one type of loading mechanism it is inserted into a cassette holder 28 (FIG. 2a) in the direction indicated by an arrow 11 with its narrow side wall first.

The analog cassette 3 shown in FIG. 1a has reel-spindle holes 6 in both main walls 7a, 7b.

FIG. 1b shows diagrammatically a digital magnetic-tape cassette 13, which comprises a housing 14 which again accommodates tape reels 15. For a more comprehensive description of the digital cassette reference is made to the non-prepublished NL Patent Applications no. 89 03 088 and no. 90 00 348. The magnetic-tape reels 15 have been wound on reel hubs 5 shown in broken lines. In the play position the reel hubs 5 engage with reel spindles, not shown, of the apparatus. Thus, this digital magnetic-tape cassette 13 has reel-spindle holes only in the lower main wall 19 of the parallel main walls 18, 19.

The magnetic-tape cassette shown in FIG. 1b has been provided with a sliding cover 16 for covering openings 9 and 10 provided in the front wall 17 of the cassette for the passage of pressure rollers and a magnetic head. In the situation illustrated in FIG. 1b the sliding cover 16 is in its closed position, in which it covers the openings 9 and 10. The sliding cover 16 is U-shaped and not only extends across the front wall 17 but also overlies an upper main wall 18 and a lower main wall 19 of the magnetic-tape cassette 13.

In the situation illustrated in FIG. 1 the magnetic-tape cassette 13 to be played is inserted into the holder of an apparatus comprising a loading mechanism, the cassette being inserted with its narrow side wall 20 facing in the direction indicated by an arrow 11. Near said narrow side wall 20 the upper main wall 18 of the cassette housing has been formed with a groove 21. A guide profile 22 is situated in the area of the front wall 17 and the upper main wall 18. In the closed position of the sliding cover 16 shown in FIG. 1b this guide profile 22 is partly covered and only an entry portion with a part of a guiding edge remains free. The guiding edge 24 projects from a guide surface 25 adapted to cooperate with an opener pin 26, shown in FIGS. 4 and 5.

Figure 2A:
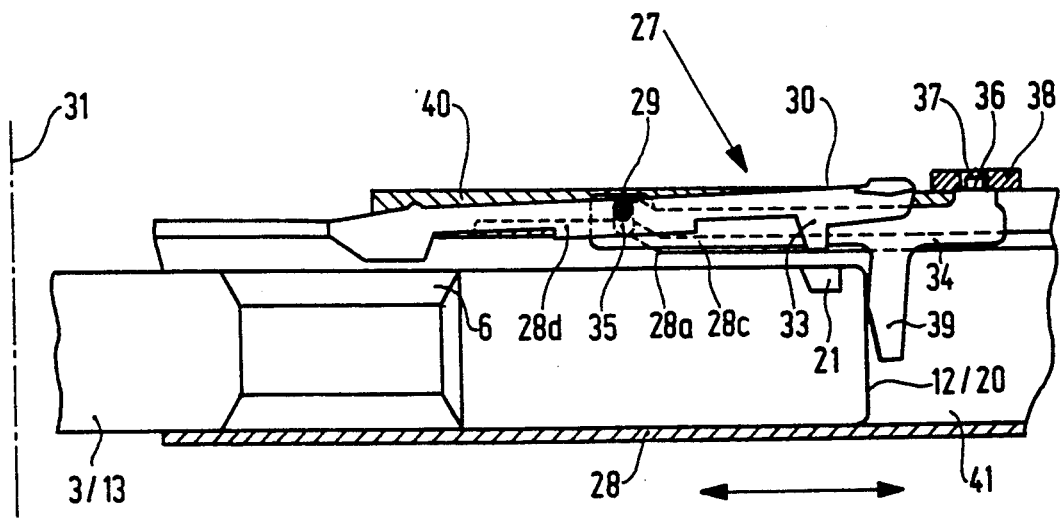
FIG. 2a shows a loading mechanism for both an analog and a digital magnetic-tape cassette with a cassette holder in the position in which the cassette can be removed or inserted by hand.

The magnetic-tape-cassette apparatus can play magnetic-tape cassettes both of the type shown in FIG. 1a and those of the type shown in FIG. 1b and comprises a loading mechanism 27. FIG. 2a shows this loading mechanism 27 in a sectional view with a fictitious magnetic-tape cassette inserted in a cassette holder 28. The cassettes having respective recesses engageable by the loading mechanism for pulling cassettes of both types into the apparatus. For the analog magnetic-tape cassette the recess is a reel-spindle hole 4 and for the digital magnetic-tape cassette the recess is the groove 21 near the narrow side wall 20. A tumbling bar 30 is supported on the upper side of the cassette holder 28 by means of a tumbling-bar spindle 29. The tumbling bar extends in the direction of insertion of the magnetic-tape cassettes 3/13 and, viewed from the front 31 of the apparatus, comprises an analog-cassette coupling member 32 and, deeper inside the apparatus, a digital-cassette coupling member 33. Either the analog coupling member 32 or the digital-cassette coupling member 33 can be pressed into the relevant recess 4 (reel-spindle hole) or 21 (coupling-member groove 21).

Figure 3A:
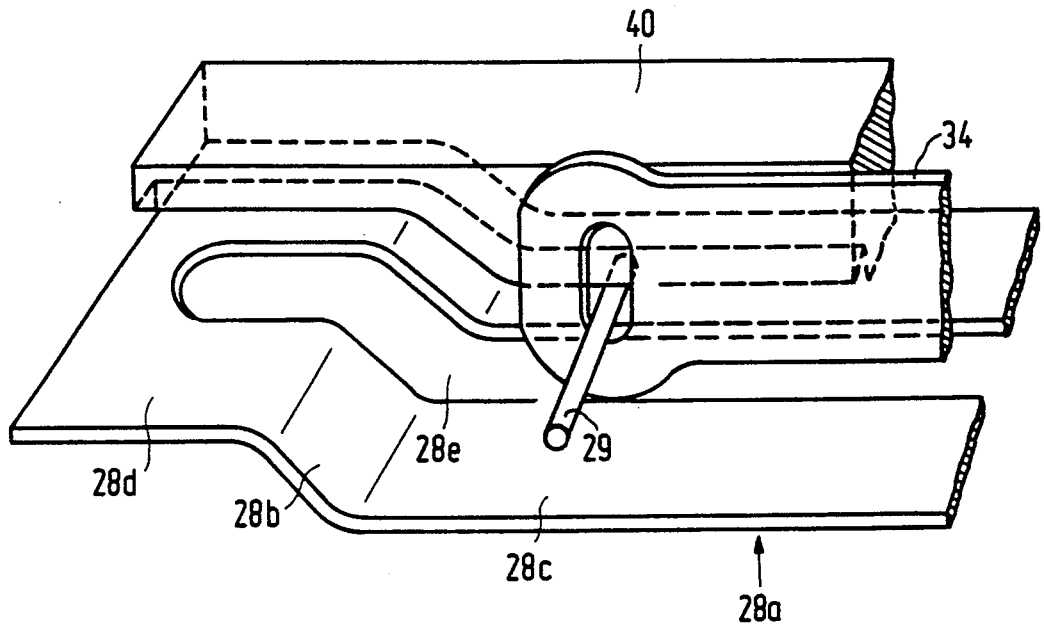
FIGS. 3a and 3b show diagrammatically parts of the loading mechanism shown in FIGS. 2a to 2c.

For a better understanding of the operation of the loading mechanism 27 the upper wall 28a of the cassette holder 28 is shown in a diagrammatic sectional view in FIG. 3a. This upper wall 28a has a ramp portion 28b which connects a portion 28c, where the cassette lies against the upper wall 28a, to a raised portion 28d, which is remote from the cassette.

Figure 3B:
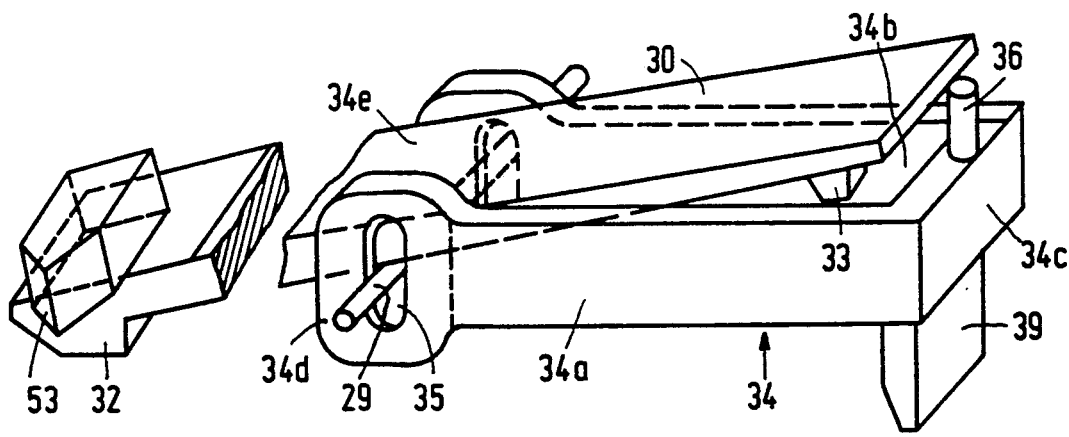

A slot 28e extends in the direction of insertion of the cassettes 3/13 through the ramp portion 28b. The tumbling-bar spindle 29 is guided over the upper wall 28a of the cassette holder transversely of the direction of insertion. The tumbling-bar spindle is guided by means of a bracket-shaped intermediate member 34, shown diagrammatically in FIG. 3b. This intermediate member 34 comprises two limbs 34a and 34b interconnected by a base portion 34c at the front side as seen in the direction of insertion. The distance between the limbs 34a and 34b has been selected in such a manner that the intermediate member is longitudinally movable in the slot 28e in the cassette holder. In order to clarify this the limb 34b is not shown in FIG. 3a. Towards the front 31 of the apparatus the limbs 34a and 34b terminate in head portions 34d and 34e formed with vertical guide slots 35. The tumbling-bar spindle 29 can move up and down in these guide slots 35. The base portion 34c carries an actuating pin 36 which engages a hole 37 in a pull-in lever 38 (FIG. 2a) of the loading mechanism. The underside of the intermediate member 34 carries a sliding peg 39. A cover plate 40 is arranged over the upper wall 28a of the cassette holder to prevent the intermediate member 34 from leaving the slot 28e.

In the situation shown in FIG. 2a the pull-in lever 38 has moved the intermediate member 34 so far towards the front wall 31 that the tumbling-bar spindle 29 has reached the raised portion 28d of the holder. As a result of this, the tumbling bar 30 has been lifted so far out of the cassette-holder interior 41 that both cassette types 3/13 are free to be removed from the loading mechanism 27.

Figure 2B:
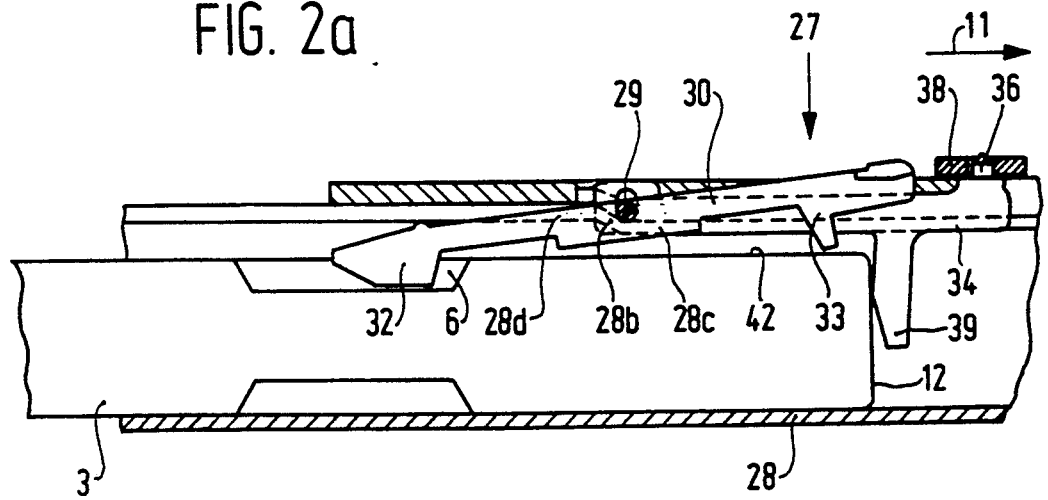
Figure 2C:
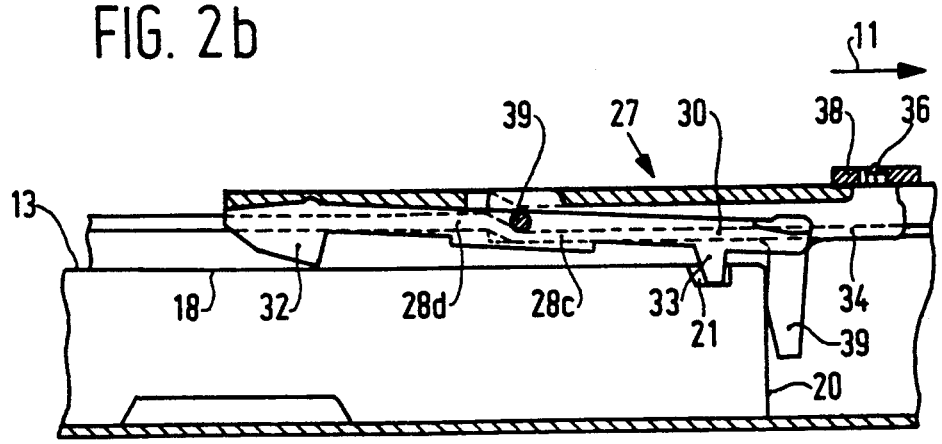
FIG. 2c shows the loading mechanism after insertion of a digital magnetic-tape cassette, a coupling member having engaged a recess in the housing of the digital magnetic-tape cassette to move the magnetic-tape cassette as the pull-in operation proceeds.

FIG. 2b shows the insertion of an analog magnetic-tape cassette 3 into the cassette holder 28. The first narrow side wall 12 of the magnetic-tape cassette 3 presses against the sliding peg 39 and the magnetic-tape cassette 3 moves the intermediate member 34 in the pull-in direction (arrow 11). The tumbling-bar spindle 29 moves down the ramp portion 28b onto the holder portion 28c which lies against the cassette. The tumbling bar 30 is now in the range of engagement with the cassette. The digital coupling member 33 comes into contact with the upper main wall 7a of the cassette 3 and presses the analog coupling member 32 into the reel-spindle hole 6. The pull-in lever 38 moves the intermediate member 34 in the direction indicated by the arrow 11 via the actuating pin 36 and, in the meantime, a motor, not shown, for motorized loading has been started. The analog coupling member 32 pulls the magnetic-tape cassette further inward via the reel-spindle hole 6. FIG. 2c illustrates the loading operation when the digital cassette 13 is pulled in. Again the starting position is as shown in FIG. 2a, in which the intermediate member 34 has moved towards the cassette front wall 31 and the tumbling-bar spindle 29 is situated on the raised portion 28d of the holder. If now the digital cassette 13 is inserted the first narrow side wall 20 again moves the sliding peg 39 in the pull-in direction 11. The tumbling-bar spindle 39 moves from the raised portion 28d onto the holder portion 28c. The tumbling bar 30 has now come within the range of cooperation with the cassette 13. The analog coupling member 32 abuts against the upper main wall 18 of the digital cassette 13 and presses the digital coupling member 33 into the groove 21. The pull-in lever 38 is moved in the direction indicated by the arrow 11 and, in the meantime, the pull-in motor has been started. This lever then moves the intermediate member 34 and the digital cassette 13 via the actuating pin 36. In this way the digital cassette reaches its playing position.

The position of the ramp portion 28b has been selected in such a way that the tumbling-bar spindle 29 cannot move from the raised holder portion 28d onto the lower holder portion 28c until the coupling members have already come in the proximity of the respective recess 6 or 21 during the pull-in movement. As a result of this, the relevant coupling member is only dragged along the upper main wall 7a over a short length, so that stress marks on the cassette are also reduced to a minimum.

The pivotal movement of the tumbling bar 30 indicates which type of magnetic-tape cassette, analog 3 or digital 13, is pulled in by the loading mechanism. This indication can also be used for initiating the movement of the sliding cover 16 into the open position.

Figure 4:
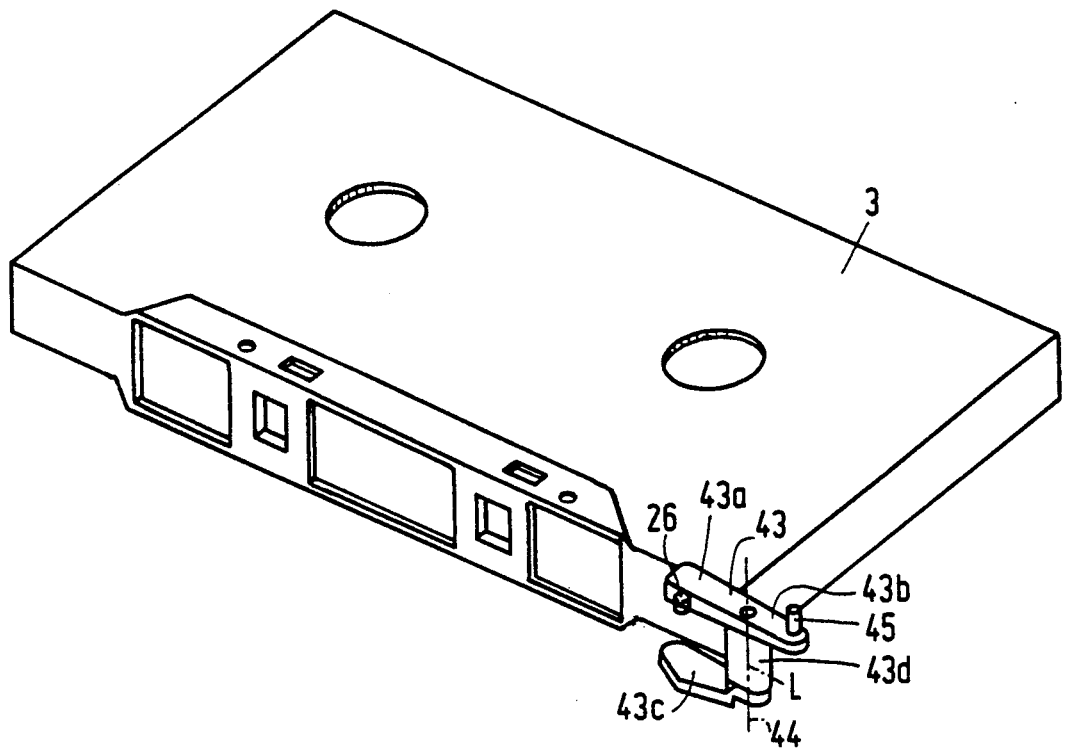
FIG. 4 shows a pivotal lever which upon insertion of the digital magnetic-tape cassette can move aside the sliding cover, which covers the openings in the front wall of the cassette, into an inoperative position.

For actuating the sliding cover 16 a pivotal lever 43 is employed, which is shown in FIG. 4. This pivotal lever 43 is pivotable about a pivotal axis 44. The two-arm pivotal lever carries the opener pin 26 on an arm 43a and an actuating pin 45 on a rearward arm extension 43c. This extension 43c extends in line with the arm 43a to the other side of the axis 44. The arm 43a and a lower arm 43b form fork tines which are pivotable to engage over the upper main wall 18 and the lower main wall 19 of the digital cassette. During playing of an analog cassette the opener pin 26 would form an obstruction. In the situation illustrated in FIG. 4 the pivotal lever 43 has therefore been pivoted in such a manner that the arm 43a and its extension 43c are situated outside the path of the cassette to be inserted. In this position of the pivotal lever 43 the analog cassette 3 can be moved into the playing position past this lever.

Figure 5:
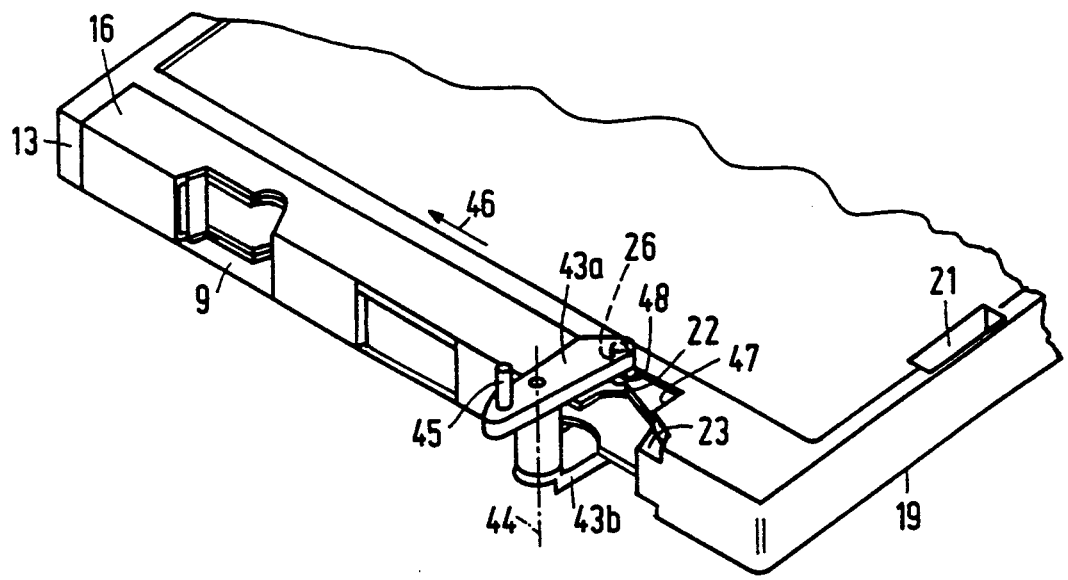
FIG. 5 shows the pivotal lever in a position in which it has engaged, over the housing of a digital cassette and has moved aside the sliding cover.

The situation is different for a digital cassette 13 because now the sliding cover 16 has to be moved in the direction indicated by an arrow 46. Therefore, the pivotal lever 43 is pivoted about the axis 44 to engage the guide profile 22 with its arms 43a and 43b. The position shown in FIG. 5 is the end position, in which the sliding cover 16 has been moved aside completely. the sliding cover 16 is pushed aside as the pivotal lever 43 is pivoted and begins at the entry portion 23. At this instant the right-hand sliding-cover edge in the drawing still lies against a stop edge 47 of the sliding-cover guide. As the cassette 13 is moved further inward the opener pin 26 moves past the guide profile 22 and moves the sliding cover 16 until it engages behind a locking edge 48 in the end position shown in FIG. 5. In this position the sliding cover 16 is locked securely in its open position. During the pivotal movement of the lever 43 the arm 43a has been pivoted over the upper main wall 18 and the arm 43b has been pivoted underneath the lower main wall 19 of the analog cassette 13. Thus, the cassette lies between the two arms 43a and 43b and the depth of engagement of the pin 26 in the guide profile is defined exactly. This ensures that the pin cannot inadvertently slip out of the guide profile.

Figure 6:
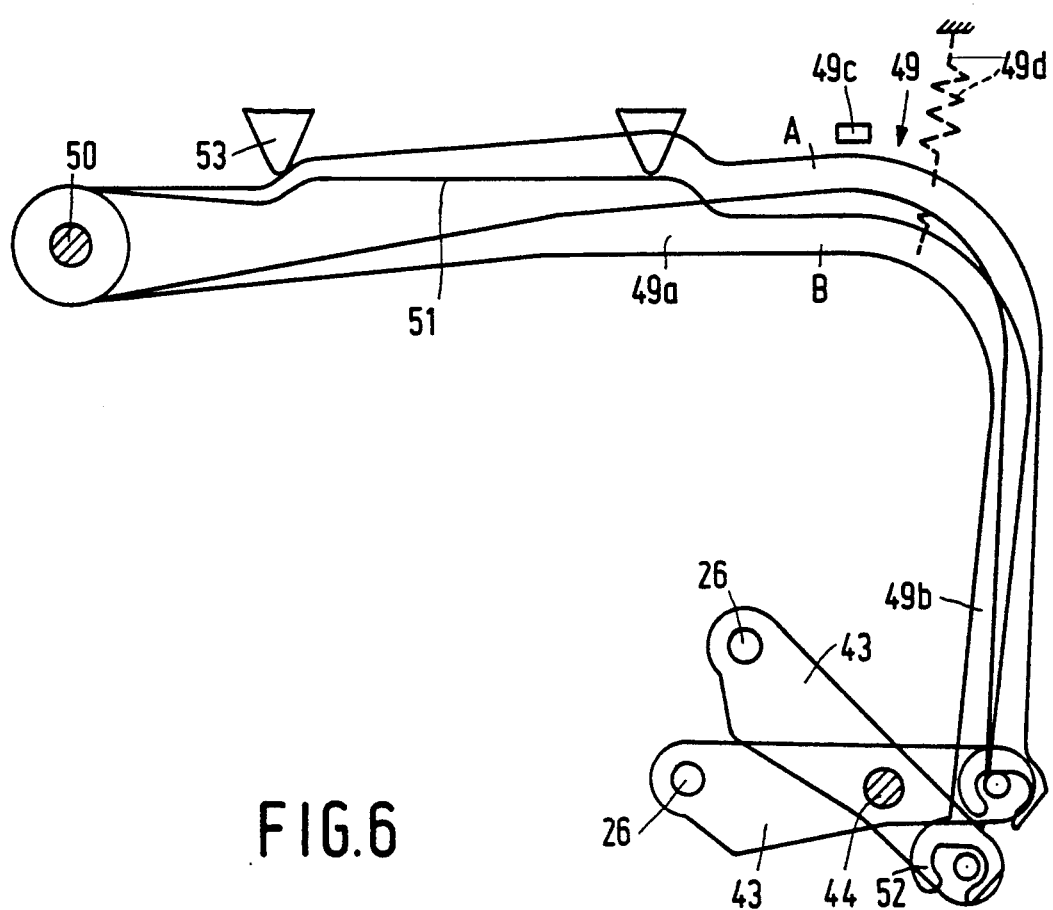
FIG. 6 shows a linkage which transmits the detection of the type of the inserted magnetic-tape cassette to the pivotal lever shown in FIGS. 4 and 5 to pivot this lever either into engagement with a digital magnetic-tape cassette or out of the range of engagement with the magnetic-tape cassette so as to enable an analog magnetic-tape cassette to be played.

The pivotal movement is transmitted by means of a linkage. This linkage 49 is constructed as a resilient plastics L-shaped member having arms 49a and 49b. The end of the arm 49a is pivotable about a pivot 50 on the cassette holder 28. The arm 49a has a control edge 51. Jaws 52 at the end of the arm 49b engage with the actuating pin 45. The tumbling bar 30, as is shown clearly in FIG. 3b, carries a projection 53 above the analog coupling member 32, which projection is shown partly in FIG. 6. If the tumbling bar 30 is in a position in which the analog coupling member 32 engages a reel-spindle hole 6 upon insertion of an analog cassette 3, the projection 53 cannot abut against the control edge 51 when the intermediate member 34 is moved in the pull-in direction indicated by the arrow 11. The projection then lies too deep for this. Therefore, the projection 53 passes underneath the arm 49a of the linkage 49. The tension between the arms 49a and 49 is such that the pivotal lever 43 occupies the position shown in FIG. 4, i.e. has left the area of engagement with the cassette. The linkage 49 then engages against a stop 49c. Instead of the arms 49a and 49b being tensioned relative to one another a tensioning spring 49d may be provided, which tends to urge the linkage 49 in the anticlockwise direction about the pivot 50. When a digital cassette is inserted and the digital coupling member 33 is pressed into the groove 21, the projection 53 moves upward and engages against the control edge 51. This means that during the insertion movement the projection 53 presses the lever arm 49 from the position A for analog playing into the position B for digital playing. The pivotal lever 43 is then pivoted clockwise and the opener pin 26 engages the guide profile 22 while the resilient linkage 49 is pretensioned.

Figure 7:
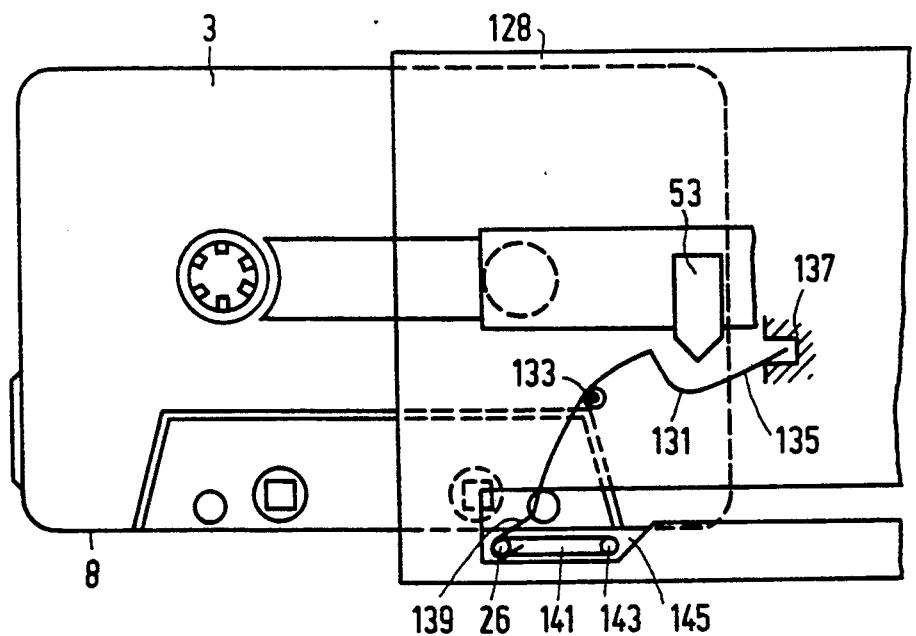
FIGS. 7 to 9 show another version of the loading mechanism and the mechanism for moving a sliding cover on the digital cassette.
Figure 8:
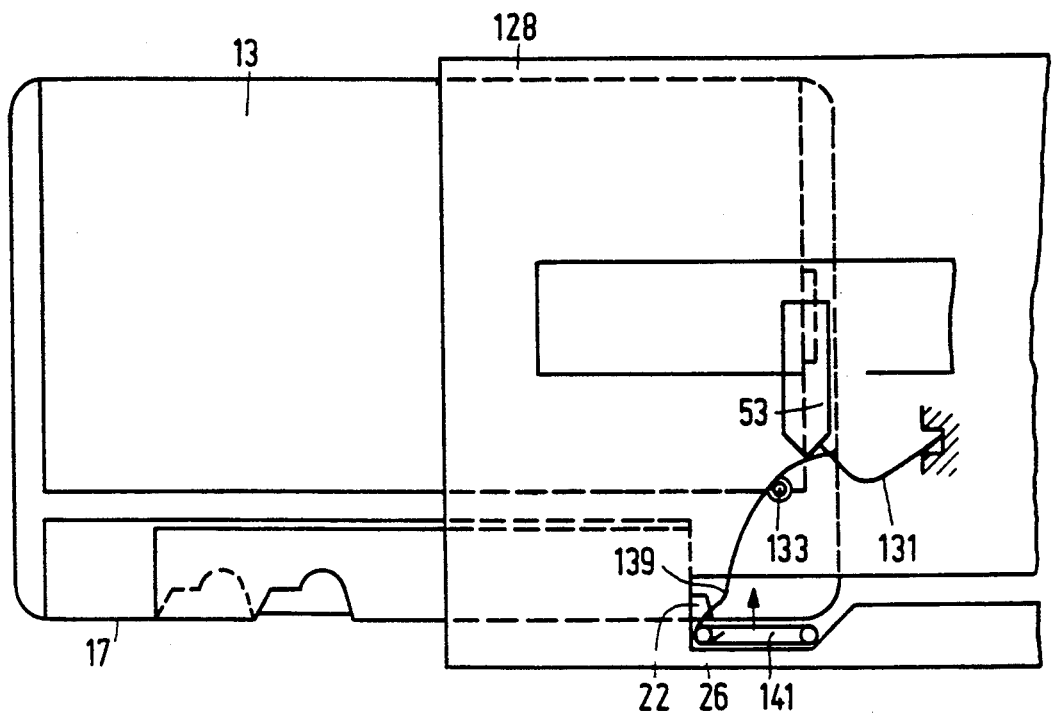
Figure 9:
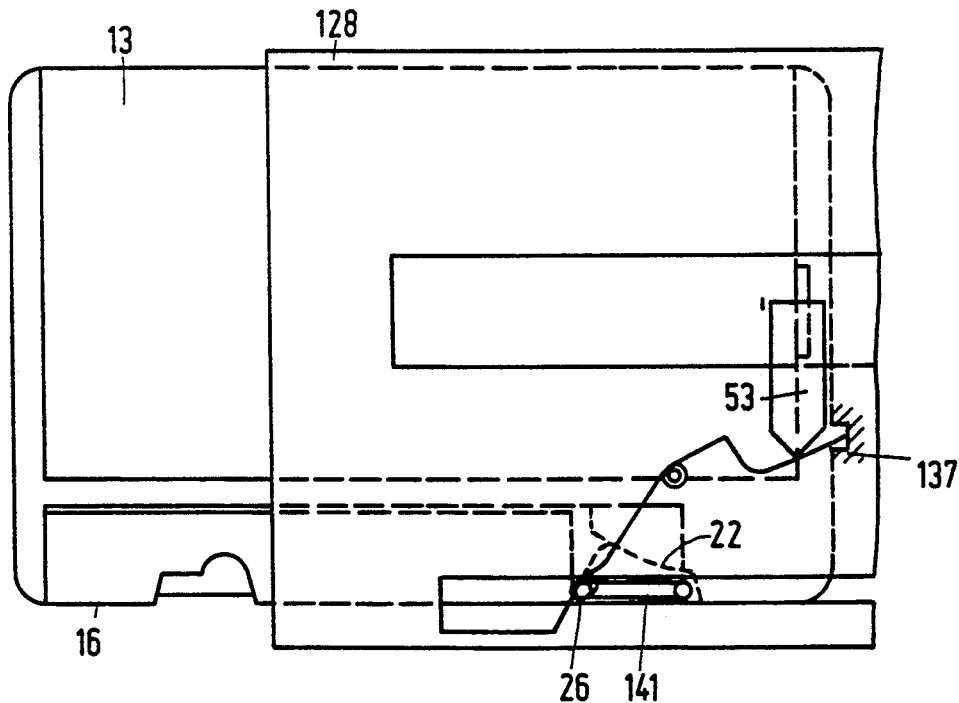

FIGS. 7 to 9 show another loading mechanism for magnetic-tape cassettes of the analog and the digital type. In FIG. 7 the cassette holder 128 contains an analog magnetic-tape cassette 3. In the same way as in the situation illustrated in FIG. 6 there is a projection 53 which can be situated above a wire spring 131 having two limbs or in the working range of this wire spring 131. The wire spring 131 is pivotable about a spindle 133 and its limbs have end portions 135, 139 which point away from the spindle 133. One free end portion 135 of the wire spring 131 engages a recess 137 in the loading mechanism. The other free end portion 139 of the wire spring 131 engages pivotally around the pin 26, which in the present embodiment is secured to a plate 141. The plate 141 also carries guide pin 143. In the situation shown in FIG. 7 both pins 26 and 143 extend perpendicularly in the plane of the drawing.

The cassette holder 128 has a recess 145 into which the plate 141 is urged by the spring 131 when no external load is applied.

When an analog cassette is inserted the projection 53 moves past the spring 131 and does not act upon it. This means that the spring 131 does not urge the plate 141 into the recess 145 and the front wall 8 of the magnetic-tape cassette 3 can move past the plate.

FIG. 8 shows the cassette holder 128 when it contains a digital cassette 13. When the digital cassette 13 is inserted deeper into the holder 128 the projection 53 is lowered into the working range of the spring 131 in a manner corresponding to that described with reference to FIG. 6. Thus, the projection 53 presses against the spring, urging it in a clockwise direction about its spindle 133. As a result of this, the spring end portion 139 tends to pull the plate 141 against the front wall 17 of the cassette.

FIG. 9 shows how the guide profile 22 has reached a position in which it faces the plate 141 when the cassette is inserted deeper. Thus, the plate can engage the guide profile 22.

When the cassette 13 is further inserted the plate 141 enters the guide profile 22. As a result of this, the guide pin 26 has moved the sliding cover 16 to the left. Thus, in this way the passages for the sound head and pressure rollers are now exposed.

Figure 10:
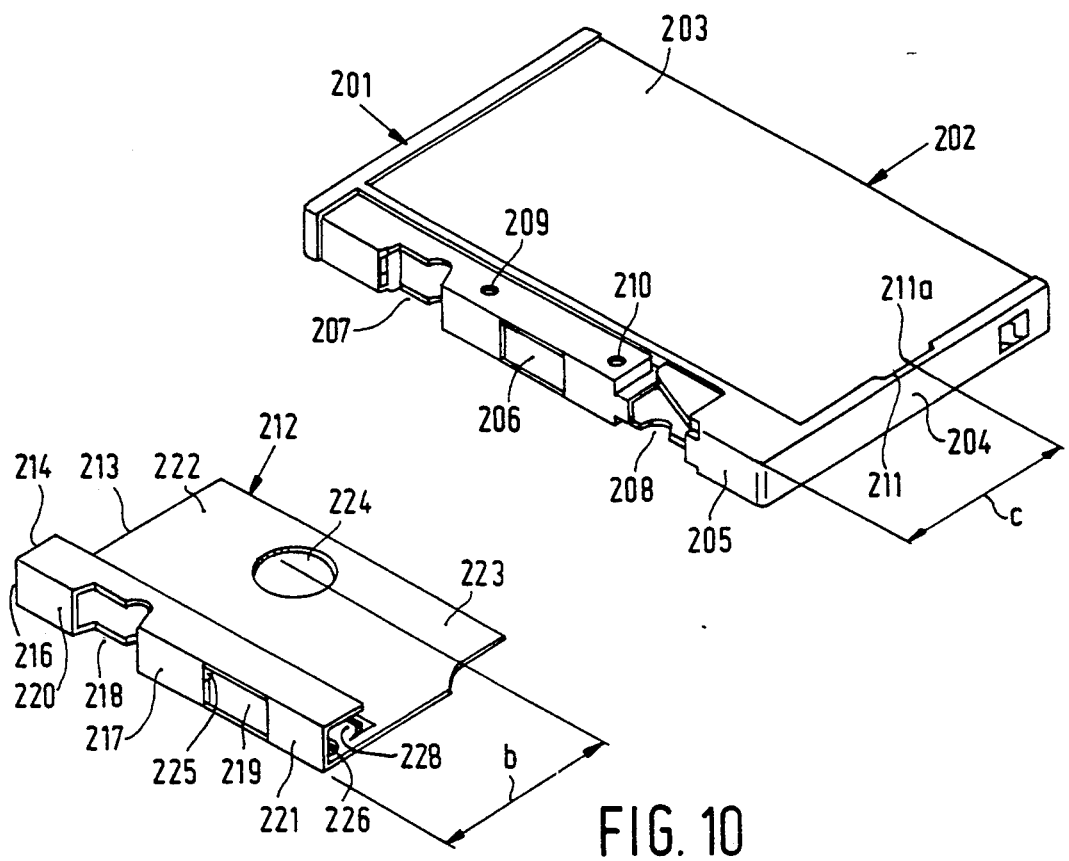
FIGS. 10 to 13 show embodiments of a digital magnetic-tape cassette and its sliding cover.

FIG. 10 shows in more detail an embodiment of a cassette in accordance with the invention. The cassette 201 comprises a housing having two main walls 203 interconnected by transverse walls 204, of which one transverse wall constitutes a cassette front wall 205. The cassette front wall 205 has a central opening 206 and at each side thereof a pressure-roller opening 207 and 208 respectively which extends into the relevant main wall. The main walls 203 are formed with passages 209 and 210 for the passage of locating pins of an apparatus. If the cassette is situated in an apparatus the capstans of the apparatus, in addition to the pressure rollers, engage in the pressure roller openings. The cassette further has a sliding cover 212 having main portions 213 and 214, which overlie the main walls 203 of the housing 202, and a sliding cover front wall 216 which extends along the cassette front wall 205. The sliding cover front wall 216 has a central front wall 217 and lateral front walls 220 and 221 at opposite sides of said central front wall and spaced therefrom by front openings 218 and 219. A main portion 213 of the sliding cover 212 has cover portions 222 and 223 for closing reel-spindle holes in a main wall of the cassette in the closed position. The main portion 213 further has a recess 224 to expose one of the reel-spindle holes in the open position. To expose the locating apertures 209 and 210 passages 225 and 226 are formed in the main portion 213. The main portion 213 further comprises bent portions 228 which serve as guide elements for guiding the sliding cover during its displacement.

Figure 11:
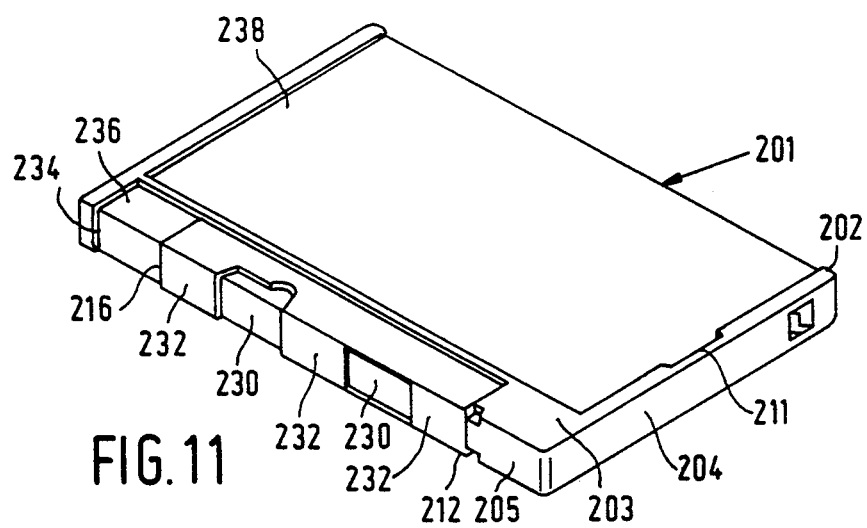

FIG. 11 shows the cassette 201 described above in its assembled condition, the sliding cover 212 being shown in its closed position. In the closed position the front openings in the sliding cover face the imperforate portion 230 of the cassette front wall 205 and the imperforate portion 232 of the sliding cover front wall 216 faces the openings in the cassette front wall 205. The portions 234 and 236 of the cassette front wall 205 and of the main wall 203 respectively are recessed. The sliding cover 212 is situated in these recesses so that the outer side of the sliding cover 212 is flush with the non-recessed portions of the housing 202. The main wall 203 further has a recess 238 for label. It is desirable to make the dimensions of the label as long as possible. Therefore, the main portion 214 of the sliding cover 212 is made as small as possible. The main portion 214 does not extend beyond half the distance b between the cassette front wall 205 and the centres of the reels, which distance is equal to the distance b between the sliding cover front wall 216 and the centre of the recess 224 in the main portion 213 of the sliding cover.

Figure 12:
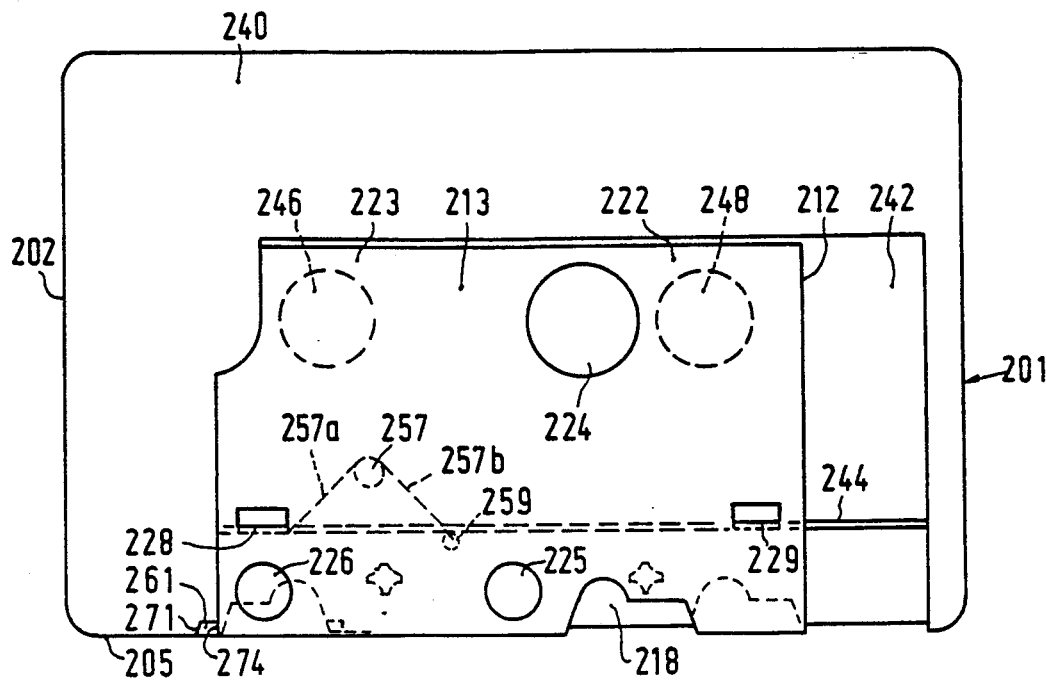
Figure 13:
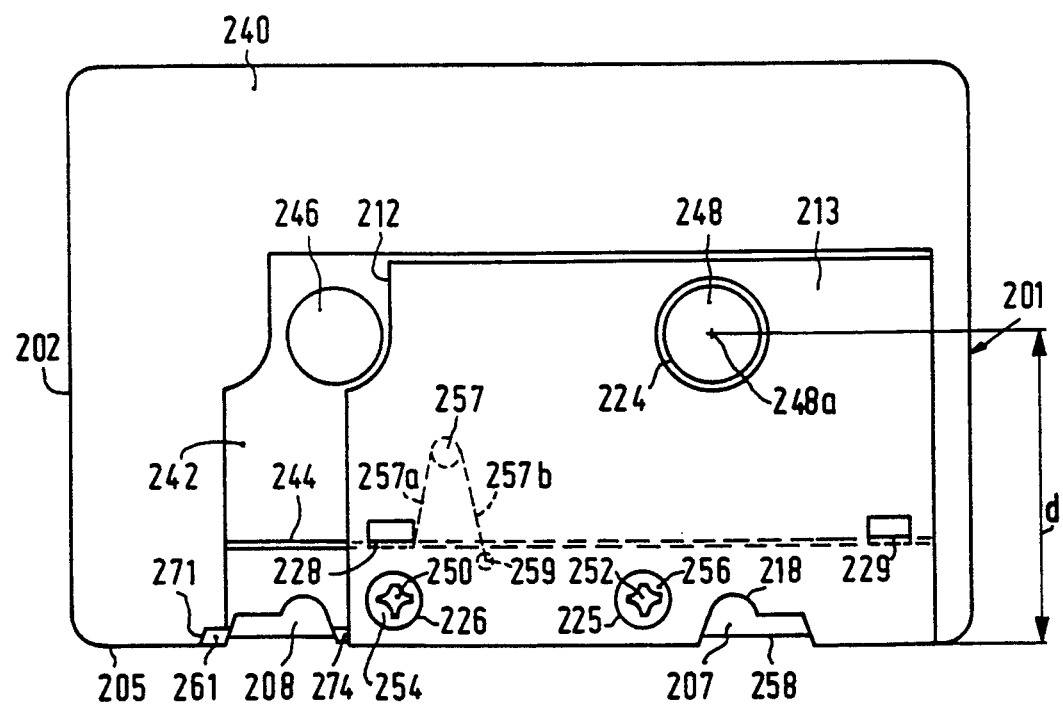

FIGS. 12 and 13 show the other main wall 240 of the cassette 201. FIG. 12 shows the sliding cover 212 in the closed position and FIG. 13 shows the sliding cover 212 in the open position. Again the main portion 213 of the sliding cover is situated in a recessed portion 242 of the main wall 240 of the housing 202. The guide portions 228 and 229 engage in a guide groove 244 in the main wall 240 of the cassette. In the closed position (FIG. 12) the reel-spindle holes 246 and 248 are covered by the cover portions 222 and 223 and the recess 224 as well as the passages 225 and 226 and the front openings 218 and 219 face imperforate portions of the housing 202 of the cassette. In the open position (FIG. 13) the recess 224 faces the reel-spindle hole 248 and the other reel-spindle hole 246 is situated beside the sliding cover 212. The passages 225 and 226 expose locating aperturtures 250 and 252 and also portions 254 and 256 of the main wall around the locating apertures, which portions 254 and 256 serve as supporting surfaces adapted to cooperate with supporting surfaces of the locating pins of the apparatus. The front opening 218 in the sliding cover exposes the pressure roller opening 207 in the housing and the other pressure roller opening 208 is situated beside the sliding cover in the open position of this sliding cover, so that the magnetic tape 258 can cooperate with inter alia tape-transport means of an apparatus. In order to ensur that the sliding cover 212 has a stable closed position the cassette 201 comprises urging means 257 which urge the sliding cover 212 back from the open position (FIG. 13) into the closed position (FIG. 12). These urging means comprise resilient means in the form of a spring 257 having two spring legs 257a and 257b. One spring leg 257a acts against the guide portion 228 of the sliding cover and the other spring leg 257b extends through a hole 259 in the main wall 240 and is thereby immobilised relative to the housing 202.

In the main wall 203 of the housing 202 a recess in the form of a groove 211 is present. The distance c (see FIG. 10) between the centre 211a of the groove and the cassette front wall 205 is equal to the distance d (see FIG. 13) between the centre 248a of the reel-spindle hole 248 and the cassette front wall 205. This allows it to make the coupling member compact and in this way it is not necessary for the coupling member to be displaceable to be able to cooperate with both the analog cassette as with the digital cassette.

We claim:

1. A system including a magnetic tape cassette apparatus, comprising a deck and a loading mechanism for loading and unloading magnetic tape cassettes, said system also including two different types of magnetic tape cassettes, each different type having a different loading and unloading associated constructed recess which enables each said cassette to be loaded and unloaded into said apparatus, said loading mechanism including a tumbling bar mounted on a spindle for rotatable movement, said spindle being located between opposite ends of said tumbling bar, said tumbling bar having a coupling member at each side of said spindle wherein said coupling members interact with said loading and unloading recesses of said different type cassettes to assist in loading a cassette, one of said coupling members cooperating with the loading and unloading recess of one type of said different types of cassettes and the other of said coupling members cooperating with the loading and unloading recess of the other type of said different types of cassettes.

2. A system as claimed in claim 1, wherein said loading and unloading recess of said one type of said different types of cassettes is a reel spindle aperture and wherein said loading and unloading recess of said other type of said different types cassettes is formed in a substantially imperforated wall of said other type of said different types of cassettes.

3. A system as claimed in claim 2, wherein said one type of said different types of cassettes has a surface which cooperates with the coupling member for the recess of the other type of said different types of cassettes to enable said coupling member associated with said recess of said one type of said different types of cassettes to enter its associated recess and wherein said other type of said different types of cassettes has a surface which cooperates with the coupling member for the recess of said one type of said different types of cassettes to enable said coupling member associated with the recess of said other type of said different types of cassettes to enter its associated recess.

4. A system as claimed in claim 3, wherein said loading mechanism includes an intermediate member for moving said tumbling bar in one direction for loading cassettes and in the opposite direction for unloading cassettes.

5. A system as claimed in claim 4, wherein said loading mechanism includes a ramp portion, said tumbling bar spindle being moved by said intermediate member to travel on said ramp toward a cassette during loading thereof and to travel on said ramp away from a cassette during unloading thereof.

6. A system as claimed in claim 5, wherein said tumbling bar spindle is moved toward a cassette when the coupling member associated with the recess in the cassette is adjacent said recess.

7. A system as claimed in claim 5, wherein said coupling member cooperating with the recess of said one type of said different types of cassettes is located at the end of said tumbling bar first encountered by a cassette during loading, said coupling member cooperating with the recess of said other type of said different types of cassettes being located at the end opposite said first encountered end.

8. A system as claimed in claim 5, wherein said other type of said different types of cassettes have walls with openings therein, which openings permit recording/reproducing operation of said cassette, said openings being covered by a cover, said tumbling bar including opening means for sliding said cover into a position wherein said openings are uncovered, said opening means including an opener pin, a linkage, and a lateral projection which cooperates with said linkage when one of said other type of said different types of cassettes is being loaded in order to pivot said opener pin into engagement with a guiding profile of said one of said other type of said different types of cassettes whereby said cover can be moved while said one of said other type of said different types of cassettes is being loaded so as to uncover said openings.

9. A system according to claim 8, wherein said linkage acts upon a lever which carries said opener pin, said lever being pivotable over a main wall of said one of said other type of said different types of cassettes while it is being loaded thereby causing said opener pin to engage said guiding profile.

10. A system according to claim 9, wherein said one of said other type of said different types of cassettes has two main walls and said lever is fork-shaped and pivotable with two arms, one arm carrying the opener pin for engaging said guiding profile, said one arm passing adjacent one of said main walls during pivotable movement while the other arm passes adjacent the other main wall.

11. A system as claimed in claim 8, wherein said linkage comprises a wire spring, a plate (141) holds the opener pin and an additional guide pin, and said plate is movable in response to said spring being engaged by said lateral projection so as to cause said opener pin to engage said guiding profile.

12. A magnetic tape cassette apparatus which receives two different types of magnetic tape cassettes each having a housing with a respective different recess which enables each cassette type to be loaded and unloaded into said apparatus, said apparatus comprising:

a loading mechanism for loading and unloading cassettes of each type, said loading mechanism including an elongate tumbling bar mounted for rotation about an axis perpendicular to its longitudinal axis, said tumbling bar having a pair of coupling members each for interacting with a respective different recess of said different types of cassettes to assist in loading a cassette, one of said coupling members cooperating with the recess of a first type of said different types of cassettes and the other of said coupling members cooperating with the recess of the second type of said different types of cassettes.

13. A magnetic tape cassette apparatus as claimed in claim 12, wherein said one of said coupling members is arranged for cooperating with said recess of said first type of cassettes which recess is a reel spindle aperture and wherein said other of said coupling members is arranged for cooperating with said recess of said second type of cassette which recess is formed in a substantially imperforate wall of said second type of cassettes.

14. A magnetic tape cassette apparatus as claimed in claim 13, wherein said coupling member for the recess of the second type of cassettes cooperates with a surface on said first type of cassettes to enable said coupling member associated with said recesses of said first type of cassettes to enter its associated recess and wherein the coupling member for the recess of said first type of cassettes is provided to cooperate with a surface on said second type of cassettes to enable said coupling member associated with the recess of said second type of cassettes to enter its associated recess.

15. A magnetic tape cassette apparatus as claimed in claim 14, wherein said loading mechanism includes an intermediate member for moving said tumbling bar in one direction for loading cassette and in the opposite direction for unloading cassettes.

16. A magnetic tape cassette apparatus as claimed in claim 15, wherein said tumbling bar is rotatably mounted on a tumbling bar spindle and said loading mechanism further includes a ramp portion, said tumbling bar spindle being moved by said intermediate member to travel on said ramp toward a cassette during loading thereof and to travel on said ramp away from a cassette during unloading thereof.

17. A magnetic tape cassette apparatus as claimed in claim 16, wherein said tumbling bar spindle is moved toward a cassette when the coupling member associated with the loading and unloading recess in the cassette is adjacent said recess.

18. A magnetic tape cassette apparatus as claimed in claim 16, wherein said coupling member cooperating with the recess of said first type of cassettes is located at the end of said tumbling bar first encountered by a cassette during loading, said coupling member cooperating with the recess of said second type of cassettes being located at the end opposite said first encountered end.

19. A magnetic tape cassette apparatus as claimed in claim 16, wherein said second type of cassettes includes walls with openings therein, which openings permit recording/reproducing operation of cassettes, a movable cover covering said openings, and a guiding profile adjacent said cover, said tumbling bar including opening means for sliding said cover into a position wherein said openings are uncovered, said opening means of said tumbling bar an opener pin, a linkage and a lateral projection which cooperates with said linkage when one of the second type of cassettes is being loaded in order to pivot an opener pin into engagement with the guiding profile of the second type of cassette such that said opening pin moves said cover while the one of said second type of cassettes is being loaded so as to expose said openings.

20. A magnetic tape cassette apparatus according to claim 19, further including a lever carrying said opener pin upon which said linkage acts, said lever being pivotable over a main wall of said other type of cassettes while it is being loaded, said pivoting of said lever positioning said opener pin such that it engages said guiding profile of an individual cassette of said second type of cassette while said individual cassette is being loaded.

21. A magnetic tape cassette apparatus according to claim 20, wherein said lever is fork-shaped and pivotable with two arms, one arm carrying said opener pin for engaging the guiding profile, said one arm passing adjacent a main wall of the individual cassette is being loaded, said other arm passing adjacent another main wall of said individual cassette while it is being loaded.

22. A magnetic tape cassette apparatus as claimed in claim 19, wherein said linkage comprises a wire spring cooperating with a plate which holds the opener pin and an additional guide pin, said plate being movable in response to said spring being engaged by said lateral projection so as to enable said opener pin to operate to engage the guiding profile or the individual cassette while it is being loaded.

* * * * *